Nov. 30, 1954     P. MARCEROU     2,695,775
MULTIPLE DRILL KERF CUTTER
Filed May 12, 1948     3 Sheets-Sheet 1
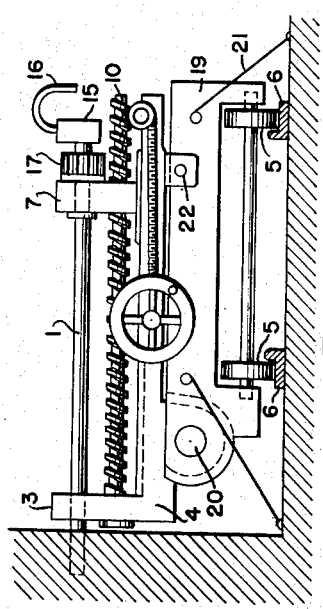
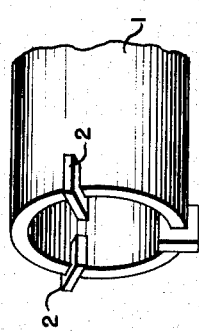
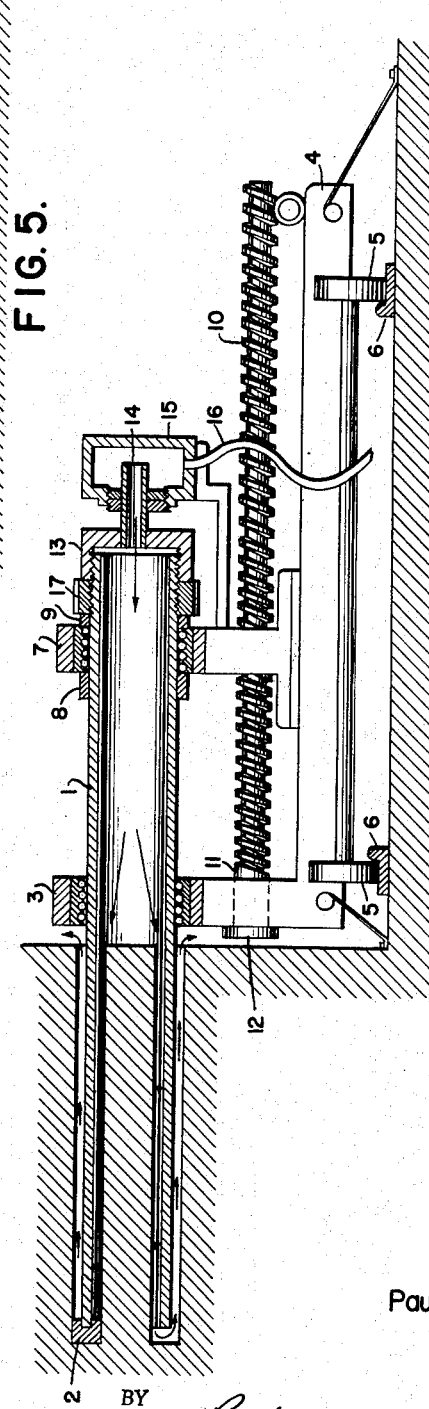
INVENTOR
Paul Marcerou
BY
Richards & Geier
ATTORNEYS Nov. 30, 1954  P. MARCEROU  2,695,775
MULTIPLE DRILL KERF CUTTER
Filed May 12, 1948  3 Sheets-Sheet 2
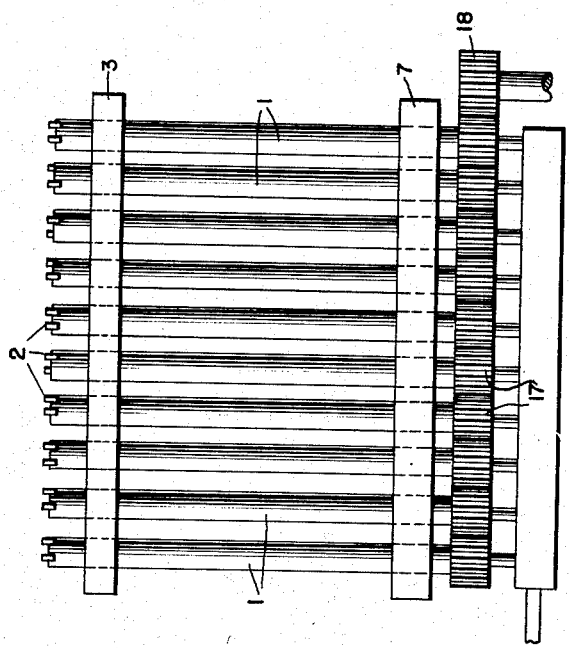
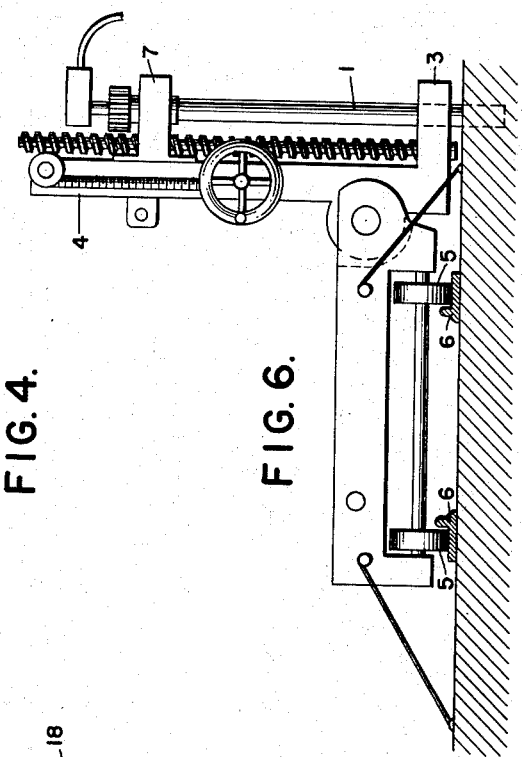
INVENTOR
Paul Marcerou
BY Richards & Geier
ATTORNEYS Nov. 30, 1954  P. MARCEROU  2,695,775
MULTIPLE DRILL KERF CUTTER
Filed May 12, 1948  3 Sheets-Sheet 3

INVENTOR
Paul Marcerou

BY *Richards & Geier*
ATTORNEYS

United States Patent Office 2,695,775
Patented Nov. 30, 1954

2,695,775
MULTIPLE DRILL KERF CUTTER

Paul Marcerou, Paris, France, assignor to "Sonapar" Societe de Participation, S. A., Luxembourg, Luxembourg Application May 12, 1948, Serial No. 26,664

Claims priority, application France May 12, 1947

1 Claim. (Cl. 262—22)

Cutting off stone blocks in quarries is usually made by first drilling directly into the lode a series of holes surrounding as closely as possible the outline of the block to be cut off, then by introducing into these holes wooden plugs which are moistened later on, so as to cause the block to be freed from the surrounding lode, owing to the expansion of the wood.

The drilling of these holes, the number of which is relatively large, is usually made by means of borers or drills, and the work required therefore is painful for the operator and lasts a long time owing to the large number of holes to be drilled and to the slowness of the operations; finally, this drilling is rendered more difficult by the fact that the drill becomes soon and very frequently blockaded by dust which is difficult to remove.

The invention has for its object a device allowing for automatic and rapid drilling of a number of holes, and generally speaking, all the holes along one edge of the block to be cut off.

The device of the invention makes use of tubular tools such as described in the patent application No. 26,665, now Patent No. 2,599,770, filed in the name of the same applicant.

The device is mainly characterized by the fact that a number of such tools are associated with common driving means allowing for equal rotations of every tubular tool as well as for equal axial movements, whereby a whole series of holes are drilled at a time and in the same manner.

Generally speaking, the device of the invention comprises thus, in combination, a number of drilling tools, a common frame for the battery of drilling tools, allowing for forward movements of said battery—i. e. towards the lode to drill—for lateral movements along the lode from which blocks are to be cut off, and for turning the frame and the associated battery of tools angularly to the lode, horizontally and sometimes vertically, driving means for rotating the drilling tools around their longitudinal axis, and finally, means for injecting water or pressure air into the holes through the drilling tools for cooling down the latter and withdrawing the dust made by drilling. The whole battery of tubular tools is preferably brought in rotation by means of a single driving member actuating only one tool pipe, every pipe being controlled by its neighbor. All the tools are usefully connected to a common water chamber.

The frame carrying the battery of pipes may conveniently comprise a truck rolling on rails on which said truck may be immobilized in any right position; the truck may also carry a pivotally mounted platform capable of being rotated with the battery of tools, so that said battery may be directed towards any desired spot. The manually actuated control member for the axial movement of the battery towards the stone wall is located at a place easily accessible, for being operable in any position of the rotatable platform.

The device of the invention and several embodiments of same are described more fully hereinafter and roughly shown in the appended drawings in which:

Figure 1 shows the leading end of the tubular drill used in the device of the invention.

Figure 2 is an elevational cross-section of a tubular drill mounted on a single frame.

Figure 3 is a plan view of a battery of tubular drills.

Figure 4 roughly shows the location of the holes to be drilled for cutting a square block.

Figure 5 roughly shows a device with pivotally mounted platform purported for adjusting the pipes angularly for horizontal, vertical or inclined drilling.

Figure 6 shows the embodiment of Figure 5 with the platform turned on 90°.

Figure 7:
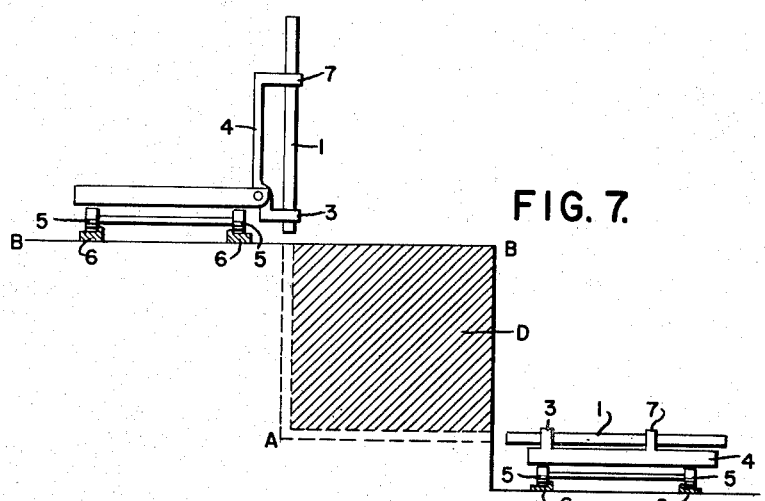

Figure 7 is a schematic representation of the operational mode for cutting blocks by drilling into two walls.

Figures 8, 9:
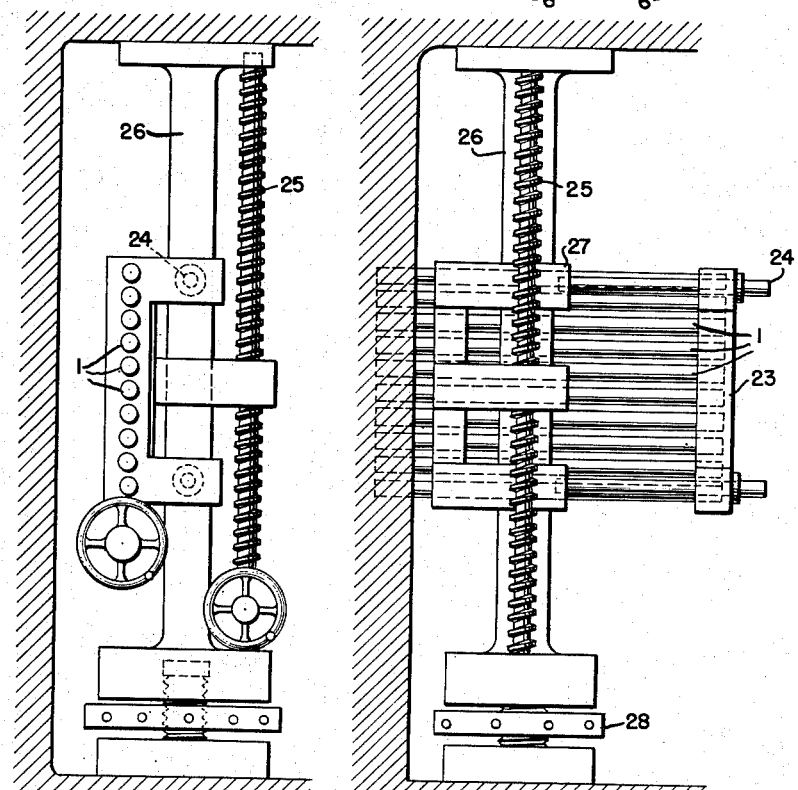

Figures 8 and 9 are respectively a front and a side elevational view summarizing a battery of pipes especially purported for underground work such as in a gallery.

In the drawings, the device of the invention makes use of tubular tools 1 having at their leading end, preferably circumferentially spaced at intervals, abrasive local masses 2 so shaped as to project outside, inside or before the pipe. The abrasive material may be tungsten, carbide, vanadium steel or the like.

The device of the invention substantially comprizes a number of such tubular tools 1 parallelly juxtaposed in rows or placed in any suitable relationship corresponding to the drilling operations to perform. The tools bear on separate bearings into a common supporting member 3 being part of a platform 4 that may be directly formed in a truck or be mounted in its turn on an underlying carriage or truck.

In the embodiment of Figure 2, the platform 4 is directly formed in a truck and has wheels 5 rolling on appropriate rails 6. The tool 1 bears, by means of another separate bearing, on a second common supporting member 7 located between two abutment rings 8—9 fixed around the tool pipe 1. This results in the translation movements of the supporting member 7 to be followed automatically and equally by the tools 1. The common supporting member 7 may glide on the truck 4, for which purpose the latter carries a transverse screw 10 the smooth end portion of which projects through the front supporting member 3 into which it is prevented from axial movement by an abutment collar 12. The screw or worm 10 may be rotated by means of manually operable control member. Every tubular tool has a rear cap 13 with central pipe 14 extending from a water chamber 15, conveniently a chamber common to all tools. This chamber is fed from a flexible hose 16. Furthermore, every tubular tool carries a sprocket wheel 17 all of which successively mesh with one another while the sprocket wheel of one lateral tool meshes with the driving sprocket 18 the axis of which is—directly or indirectly—rotated by appropriate power means.

This simple device allows thus for rotation and axial movement in the same manner of a whole series of tubular tools, so as to drill into the stone lode an equal number of holes surrounding the edge of block to cut off. The rotation of the tool pipes is automatically obtained by rotating the driving sprocket 18 whilst the longitudinal movement is usually imparted and controlled by manual means, for instance by means of a handwheel. Obviously, an automtaic device with speed variator may be adapted as desired.

Several embodiments of this relatively simple though very efficient device are possible.

In a first alternative, the device is rendered more efficient by allowing for angular adjustment of the tools proper independently of the truck. With a view to this, it sufficies to associated the above mentioned embodiment shown in Figure 2 with an underlying carriage or truck upon which the plateform 4 is mounted pivotally. Such an arrangement is shown in two characteristic positions in Figures 5 and 6. In these figures, the device comprises the same parts as in Figure 2 but with the platform 4 pivotally mounted on an underlying truck 19 by means of a pivot or shaft 20; blocking means 22 of known kind allow for immobilization—by pressure for instance—of the platform 4.

In this way, the platform 4 may turn around the front shaft 20 and be kept immobilized in any desired angular position. Such a device is especially adapted for drilling with equal facility in horizontal and vertical positions. Whatever the device may be, it is always easy to be immobilized in front of the place to be drilled, for instance with the aid of cables 21 or with like means.

The operations may be performed with one device as well as with several ones drilling at the same level or at different levels of the stone quarry.

Figure 7 roughly shows how to cut off a block by using devices according to the invention, placed at different levels, respectively A—A and B—B; in this instance, it is advisable to use devices as shown in Figures 5 and 6, one device being brought at the level A—A and drilling horizontally whilst the second one moves at the level B—B and drills vertically, so that the block D is automatically determined by its three dimensions. Finally, the device may be adapted substantially the same for underground work. Indeed, it suffices to modify the supporting members of the tubular tool battery or to change the truck for a number of mine-props capable of immobilizing the battery as required. This arrangement is shown in Figures 8 and 9 where the device comprises the same tool pipes mounted into a common supporting member 23 which may slide with guiding tubes 24 into a carriage 27 the vertical movements of which depend on a worm 25; the carriage 27 is guided on a shaft 26 mounted on a jack 28 so that the device may be rigidly fixed between the bottom and roof of the gallery.

It is obvious that the device of the invention may be realized under many a different form, so that it may be used in practically every case when it is desired to drill several holes into stone or rock with a view to cut off blocks of any convenient shape.

Whatever its applications may be, the device enables for saving a considerable time as for noticeably reducing the necessary power. Indeed, such a device needing a power of 8–10 H. P. and attended to by one operator may produce as much work as what would up to now have required ten workers and five 40 H. P. compressed air groups.

In addition, the operations are done faster and easier owing to the fact that tool-blockading, which slow down the drilling, is practically non-existent by the invention.

It is evident that the embodiments detailed above and shown in the appended drawings are chosen as mere examples only; it is possible, without departing the scope of the invention, to alter their shape and sizes or to change the driving means and supporting means for any equivalent means or any device with the same function.

What I claim is:

A block and slab cutting device for quarries, mines, and the like, said device comprising, in combination, a plurality of tubular drilling tools, each of said tubular drilling tools consisting of a tube having a leading end, and a plurality of comparatively small abrasive means carried upon said leading end, means connected with said tools for rotating them individually about their longitudinal axes, a platform, a pivot for pivoting said platform about a horizontal axis, a support mounted upon said platform and rotatably supporting said tools, whereby said tools are swingable about said pivot, another support slidably mounted upon said platform, a worm carried by the first-mentioned support and meshing with the second-mentioned support for moving the second-mentioned support, abutment rings operatively connecting said tools with said other support, whereby said tools are slidable upon said platform, means forming a single transverse water chamber extending parallel to said support and adjacent to the rear ends of said tools and means connected with the rear ends of said tools and said water chamber for supplying a cooling fluid to the operative front ends of said tools and removing shavings therefrom, said water chamber supported by said other support.

References Cited in the file of this patent

UNITED STATES PATENTS

| Number | Name | Date |
|---|---|---|
| 346,328 | Tacy | July 27, 1886 |
| 722,759 | Scales | Mar. 17, 1903 |
| 994,866 | Muhleisen | June 13, 1911 |
| 1,130,660 | Ball et al. | Mar. 2, 1915 |
| 1,805,899 | Wright | May 19, 1931 |
| 1,915,001 | McKinnon | June 20, 1933 |
| 2,089,944 | Cadwallader | Aug. 17, 1937 |
| 2,371,698 | MacFarlane | Mar. 20, 1945 |

FOREIGN PATENTS

| Number | Country | Date |
|---|---|---|
| 558 | Great Britain | Feb. 28, 1865 |